United States Patent [19]

Warner

[11] 4,190,960
[45] Mar. 4, 1980

[54] PLOTTER

[76] Inventor: Louis A. Warner, 5824 N. Ottawa, Chicago, Ill. 60631

[21] Appl. No.: 966,312

[22] Filed: Dec. 4, 1978

Related U.S. Application Data

[63] Continuation of Ser. No. 827,164, Aug. 23, 1977, abandoned.

[51] Int. Cl.² ............................................. G01C 21/20
[52] U.S. Cl. .................... 33/1 SD; 33/403; 33/431
[58] Field of Search ........... 33/1 SD, 1 B, 1 N, 75 R, 33/76 VA, 111, 107

[56] References Cited

U.S. PATENT DOCUMENTS

| | | | |
|---|---|---|---|
| 3,271,866 | 9/1966 | Gruber et al. ...................... | 33/75 R |
| 3,280,464 | 10/1966 | Warner ............................... | 33/1 SD |
| 3,496,640 | 2/1970 | Warner ............................... | 33/1 SD |

FOREIGN PATENT DOCUMENTS 121240  12/1918  United Kingdom .................... 33/1 SD Primary Examiner—William D. Martin, Jr.
Attorney, Agent, or Firm—Jakala, Knechtel, Valentino, Demeur & Dallas

[57] ABSTRACT

A navigational plotter which generally comprises a rectangular elongated member comprising two straight edges and having a circular protractor rotatably secured thereto in the geometric center. The rectangular elongated member has a plurality of distance scales formed along and adjacent to each of the two opposite longitudinal straight edges thereof. These distance scales correspond to, for example, statute miles, nautical miles or kilometers, and each scale is spaced apart from the other to provide between adjacent scales a clear, unobstructed course line window which permits the navigational plotter to be placed over or adjacent to a course line on a chart without obscuring it. The scales along one longitudinal straight edge of the navigational plotter can correspond to the scaling of, for example, sectional charts, while those along the opposite longitudinal straight edge can correspond to, for example, the scaling of the WAC charts.

5 Claims, 2 Drawing Figures

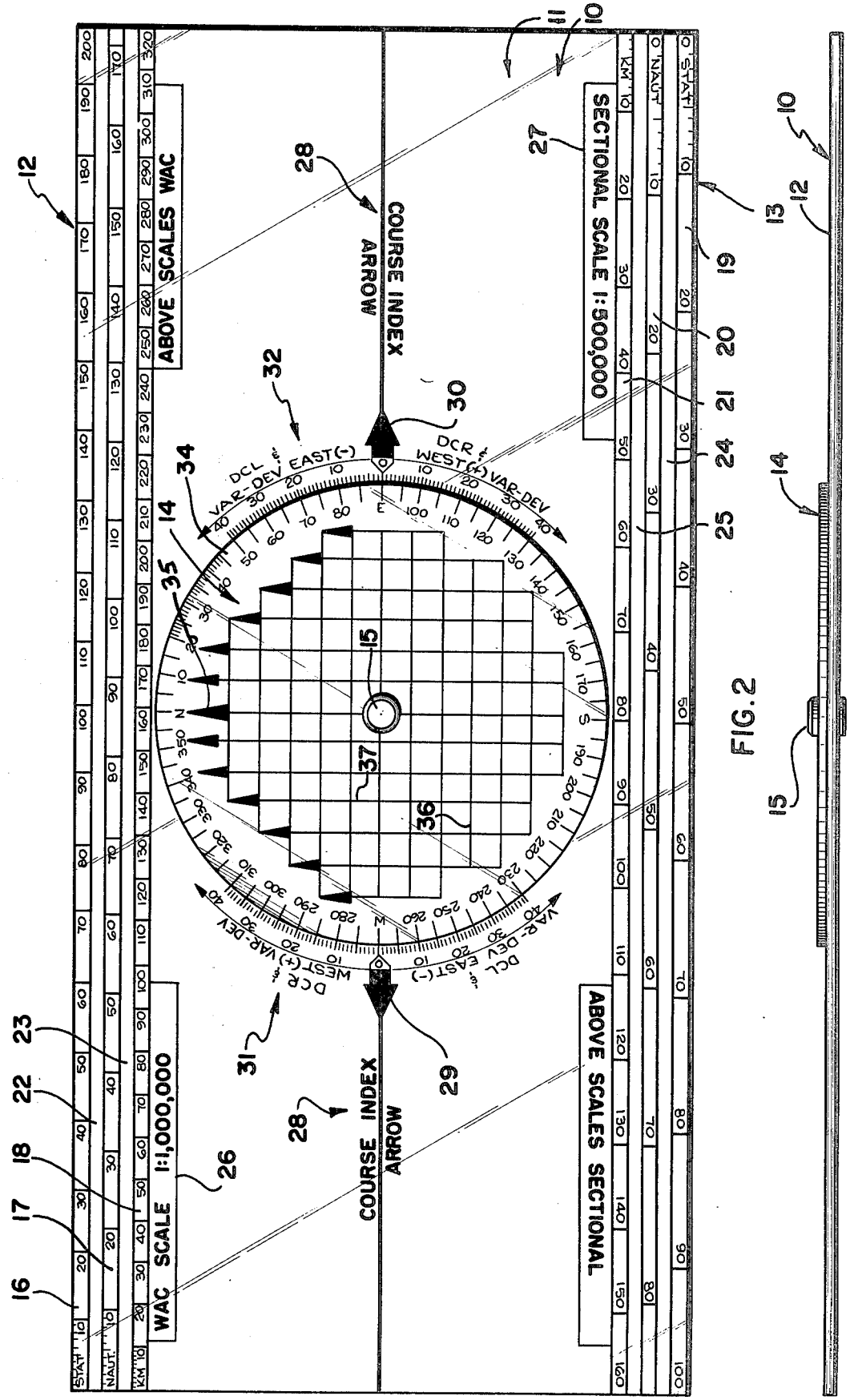

PLOTTER

This is a continuation application of Ser. No. 827,164, filed Aug. 23, 1977 now abandoned.

BACKGROUND OF THE INVENTION

This invention relates to a direction and distance plotting device for use in air navigation. More particularly, the invention relates to a navigational plotter which is universally applicable for use with a variety of air navigation charts, whether they are sectional (SEC) or world air charts (WAC), or ONC charts. More particularly still, the navigational plotter is universally applicable for use with both sectional and WAC air charts, whether the scales on the charts are designated in units under the U.S. system or the metric system.

Air charts are generally sectional charts which are scaled 1 to 500,000, or WAC charts which are scaled 1 to 1,000,000. While there are navigational plotters presently commercially available that have both sectional and WAC scales on them, most of them are generally undesirable since the many scales printed thereon make it difficult to determine quickly which one of the many scales is to be used. Further still, most of these available navigational plotters have the scales printed or otherwise provided on them such that the scales are directly adjacent to each other and many times obscure the correct reading.

In view of the recent legal requirements for adopting the metric system in the United States, many air charts are or soon will be converted partially or totally to the metric system. As is normally the case, during the interim period, many aircraft pilots, as well as others, will find themselves having old charts which are scaled in the U.S. system and new charts which will be scaled in the metric system. They, therefore, will be confronted with the necessity of having at least two navigational plotters, one adapted for each of the respective system.

With reference to the navigational plotters that are presently commercially available, these plotters generally may be classified as conversion systems using adjacent scales for determining equivalent values. The process in using these plotters involves spotting the equivalent value and then counting graduations visually to determine the desired equivalents. This, in some cases, is more easily said then done. Holding a point by eye, and at the same time, counting from a calibrated graduation left or right can become quite difficult. This problem is solved on slide rules, for example, by the use of a movable hairline which holds the point of equivalence, while the graduations are counted to establish the conversion value. With a hairline, several scales can be crossed with ease. Obviously, it is not feasible to use such a movable hairline with multi-scale plotters of the type with which the invention is concerned. Therefore, in accordance with the present invention, a practical solution is provided in this invention by separating the scales laterally and providing a transparent gap between the individual scales, so that each scale may be positioned directly adjacent, for example, to a course line on a chart. This obviates the necessity for "eye-balling" across a plurality of scales, and reduces the possiblity of potentially dangerous errors. The invention further simplifies the construction of such plotters by printing all the necessary scales on one side thereof, thereby eliminating the two-sided or double-faced construction currently used, with the necessary concommitant increased cost.

In general, a plotter is a navigational tool which combines a straight-edge, for drawing course lines; scales for measuring distances; and a protractor for measuring directions. The construction of the plotter of the present invention provides two unobstructed straight edges, for drawing course lines and for laying off course lines in specific directions; a plurality of distance scales to correspond to the specific chart scales in use; and a 360° protractor for measuring directions in conjunction with a North-South or meridian of longitude on a chart. It also provides a zero center correction scale for mechanically correcting for wind drift, compass variation and deviation. Also, as in all previous plotter patents issued to the present applicant, the distance scales are positioned below the straight edge. This construction conforms to the accustomed procedure in using a ruler, where the scales are customarily positioned below the straight edge of the ruler. Further still, the distance scales are appropriate to charts now in use by the air navigator and, additionally, include the kilometer scales which will become mandatory in the foreseeable future.

For the relatively slow aircraft, and in the circumstances where radio aid cannot be used and dead reckoning or pilotage navigation must be restored to, the sectional charts (scale 1 to 500,000) with their greater display of surface detail are, by far, the most suitable. The statute mile scale is appropriate for aircraft with airspeed indicators calibrated in miles per hours (mph); the nautical mile scale, likewise is appropriate for airspeed indicators calibrated in knots (nautical miles per hour). The kilometer scale is provided for aircraft operating in countries where the metric system is standard, and in countries like the United States where the metric system is gradually becoming mandatory. The world air chart (WAC) or ONC charts at a scale of 1 to 1,000,000 with a lesser display of service detail are, in essence, more suitable for relatively faster moving aircraft. The selection of the statute, nautical or kilometer scale, again, depends on the calibration of the airspeed indicator in the aircraft being flown, and in the country over which the aircraft is being flown. A unique feature of the plotter of the invention is the lateral separation of the various distance scales with transparent longitudinal gaps between them. This construction serves a two-fold purpose. First, it precludes the necessity for eye-balling across intermediate scales to obtain a desired reading. Any scale may be individually and separately placed directly under the course line and thus reduce or eliminate the possiblity of error.

The protractor component of the plotter consists of a zero to 360° unit calibrated by a single scale clockwise, as is the method used in all navigational instruments such as magnetic compasses, peloruses, radio direction finders, small area plotting sheets, the compass roses printed on navigational charts, etc. With this type of plotter construction, only one mode of operation is required anywhere on the chart. By way of contrast, the half-circle plotter (180°) protractor is calibrated in the wrong counter-clockwise direction and provides three modes of operation dependent upon the position of the plotter on the chart. Thus, the wrong direction of calibration, the ambiguity of two scales, and the three different modes of operation can and quite often do cause serious errors which by all means should be avoided!

In addition, the protractor of this invention incorporates a rectangular grid whose vertical lines are parallel to the North-South or zero to 180° line direction of a protractor, and horizontal lines which are parallel to the East-West, that is, 90° to 270° line, on the p rotractor. Furthermore, each vertical line includes an arrowhead at the North end to facilitate orienting the protractor toward the top of the chart and to True North. To orient the protractor to True North on the chart the protractor is turned so that the grid lines are directly over or parallel to a meridian of longitude or a parallel of latitude. To add to the usefulness of the plotter of this invention, a zero center correction scale is provided to mechanically correct for and act as a check on wind-drift correction, and magnetic variation and deviation correction.

The plotter of the present invention represents the first major design improvement in such plotters in over 40 years. These improvements include for the first time two separate straight edges, six individual and isolated distance scales, that can be read one at a time, and a zero center scale for mechanically, rather than mentally, correcting for drift variation and deviation. Practical air navigation frequently requires simple interconversions of statutes, nautical and kilometer units of measurement for distances and speed. In fact, historically from the very beginning of early navigational computers, they included special indices for making such conversions.

Now, for the first time, the plotter of the invention can provide this basic and necessary requirement as an ancillary operation. The distance scales, inherently a part of the construction, provide easy conversions. For coarse readings, the WAC scales are appropriate, and for finer readings, the sectional scales are better suited. When scanning across the adjacent scales, a vertical line on the chart, such as a meridian of longitude or a North-South section line, very conveniently acts as a hairline, just like that on a straight slide rule.

Accordingly, it is an object of the present invention to provide an improved navigational plotter which not only is applicable for use with both sectional and WAC air charts but is applicable for use with both types of charts whether scaled in accordance with the present U.S. system or the metric system.

Further still, it is an object of this invention to provide a navigational plotter having the scales provided thereon in a fashion such that any one of the scales can be used without obscuring any desired distance scale or to require reading across various scales to obtain the proper measurement.

Still another object of this invention is to provide two zero-center correction scales to mechanically offset the normally encountered navigational errors of wind drift, magnetic variation and deviation. Also provided in this invention is a longitudinal line equidistant from the two longitudinal edges of the plotter, marked with two course index arrows to point out the course directions. Since all parallel lines have the same direction, the geometric directions of the parallel distance scales are all simultaneously indicated by the course index arrows.

Other objects of the invention will in part be obvious and will in part appear hereinafter.

SUMMARY OF THE INVENTION

The above outlined objectives are provided by the navigational plotter of the invention which generally comprises a rectangular elongated member comprising two straight edges and having a circular protractor rotatably secured thereto in the geometric center. The rectangular elongated member has at least three distance scales formed along and adjacent to each of the two opposite longitudinal straight edges thereof. These distance scales correspond to, for example, statute miles, nautical miles and kilometers, respectively, and each scale is spaced apart from the other to provide between adjacent scales a clear, unobstructed course line window which permits the navigational plotter to be placed over or adjacent to a course line on a chart without obscuring it. The scales along one longitudinal straight edge of the navigational plotter correspond to the scaling of the sectional charts, while those along the opposite longitudinal straight edge correspond to the scaling of the WAC charts.

The circular protractor has a compass rose adjacent its peripheral edge, with the compass rose being calibrated from 0° to 360° clockwise. The diameter of the circular protractor is less than the width of the rectangular elongated member, and preferably is less than the spacing between the two most closely adjacent scales along the opposite longitudinal straight edges of the rectangular elongated member so that the compass rose does not overlap or obscure any portion of these scales.

The circular protractor furthermore is marked with a plurality of horizontal and vertical grid lines which are parallel to the East-West and the North-South directions of the compass rose respectively. These grid lines may be used to easily and speedily orient the protractor to the True North meridian on the chart with which the plotter is being used. The rectangular elongated member also is marked with an arcuate auxiliary zero-center correction scale, in cooperative relation with the circular protractor, to enable mechanical adjustments of the plotter to include corrections for wind drift, magnetic variation, and deviation.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in conjunction with the accompanying drawing, wherein:

FIG. 1 is a top plan view of a navigational plotter exemplary of the present invention; and FIG. 2 is a side plan view of the navigational plotter of FIG. 1.

DETAILED DESCRIPTION OF A PREFERRED EMBODIMENT

Referring now to the drawing, a universal navigational plotter 10 exemplary of the present invention is shown comprising a rectangular elongated straight edge member 11 having two unobstructed straight edges 12 and 13, and having a circular protractor 14 rotatably secured to its center by means of a pivot member 15.

The rectangular straight edge member 11 has scales 16–18 which are calibrated in accordance with statute miles, nautical miles and kilometers, respectively, along and adjacent to the one longitudinal straight edge 12 thereof, which scales are further calibrated in accordance with the scale of a WAC chart. Indicia such as that indicated by the reference numeral 26 is provided on the rectangular straight edge member 11, in association with the scales 16–18, to clearly indicate to the user the type of chart with which these scales are to be used.

Correspondingly, scales 19–21 which are calibrated in accordance with statute miles, nautical miles and kilometers, respectively, are provided along and adjacent to the opposite straight edge 13, and these scales 19–21 are calibrated for use with sectional charts. Indicia 27 is provided on the rectangular straight edge member 11 in association with these scales 19–21 to advise the user that these scales are to be used in conjunction with sectional charts.

The surface of the rectangular straight edge member 11 beneath the respective ones of the scales 16–21 can be made opaque, if desired, to highlight these scales so that they may be more readily observed.

Between the scales 16–18, there are provided clear unobstructed course line windows 22 and 23, which permit the two scales 17 and 18 to be used to establish or read a course line, without the latter being obscured by any of the scales 16–18 along this longitudinal straight edge of the plotter 10. In using the scale 16, the longitudinal straight edge of the plotter 10 obviously is used in conjunction with the course line, so that when using this scale 16, the course line again is not obscured in any fashion. In accordance with the invention, the scales are spaced apart to provide course line windows 22 and 23 which are at least $\frac{1}{8}$ inch in width.

Correspondingly, course line windows 24 and 25 are provided between the scales 19–21 along the longitudinal edge of the rectangular straight edge 13. These course line windows 24 and 25 are provided and used in the same fashion as the course line windows 22 and 23.

The circular protractor 14 has a compass rose 34 adjacent its peripheral edge, with the compass rose being calibrated from 0° to 360° clockwise, with the 0 and 360th calibration corresponding to North of the compass rose and indicated accordingly by means of a large arrowhead 35. The 90th, 180th and 270th calibrations, of course, correspond to East, South and West of the compass rose, respectively, and each of these directions, as well as North on the compass rose, are indicated by the appropriate capital letters N, E, S and W. A number of grid lines, such as the grid lines 36 and 37, form a rectangular grid on the face of the protractor 14, for orienting the protractor to True North. Each of the North-South grid lines has an arrowhead on its one end to clearly indicate the proper True North direction.

The rectangular straight edge member 11 has a course line 28 as well as index arrows 29 and 30 provided on it in operative relationship with the circular protractor 14. Zero center arcuate scales 31 and 32 also are provided on the rectangular straight edge member 11 in operative relationship with the course line 28 and the circular protractor 14, to provide mechanical corrections for wind drift magnetic variation and deviation.

The diameter of the circular protractor 14 is less than the width of the rectangular straight edge member 11 and preferably also is less than the distance between the most closely adjacent ones of the distance scales along each of the opposite longitudinal straight edges 12 and 13 of the rectangular straight edge member 11, so that the circular protractor 14 does not obscure any portion of any one of the distance scales 16–21.

In using the navigational plotter 10 to measure the distance and the true course between two points on a chart, whether it is to be measured in accordance with the U.S. system or the metric system, the navigational plotter 10 is placed on the chart, with the upper edge of the appropriate one of the scales 16–21 aligned between the two points and with the 0 calibration under the first point so that the distance may be read on the appropriate ones of the distance scales under the second point. If the chart is a WAC air chart and distance is to be measured in accordance with the U.S. system, the straight edge of the rectangular straight edge member 12 is aligned between the two points, with the 0 calibration of the statute distance scale 16 aligned under the first point, so that the distance may be read on the scale 16 under the second point. If the chart is a WAC chart and distance is to be measured in accordance with the U.S. system for nautical miles, the upper edge of the nautical distance scale 17 is aligned between the two points, with the 0 calibration of the nautical distance scale 17 under the first point, so that the distance may be read on the nautical distance scale under the second point. It may be noted that the clear, unobstructed course line window 22 permits the course line to be easily and clearly observed, since it is not obstructed by any one of the other distance scales on the straight edge member 12. Correspondingly, if the scale of the chart is to be measured in accordance with the metric system, the upper edge of the kilometer distance scale 18 is aligned between the two points, with the 0 calibration of the kilometer distance scale 18 under the first point, so that the distance may be read on the kilometer distance scale 18 under the second point. Again, the clear, unobstructed course line window 23 permits the course line to be easily and clearly observed by the user, since it likewise is not obstructed or obscured in any fashion by any one of the other distance scales.

In the event that the charts are sectional charts, the appropriate one of the distance scales 19–21 along the opposite longitudinal edge of the straight edge member 12 is used. The procedure for measuring distances is then the same as that described for the WAC or ONC chart.

The rectangular straight edge member 11 is then held fixed against the chart and the circular protractor 14 rotated so that all of the grid lines 37 having the arrowheads on their one end point of True North. With this plotter, this is easily accomplished by merely orienting any one of the grid lines 37 over, or in parallel width, with respect to a meridian line of longitude on the chart. The true course is now indicated on the compass rose 34, aligned with one or the other of the index arrows 29 and 30, depending upon which group of distance scales 16–18 or 19–21 is being used. In this respect, it may be noted that the arrangement permits the circular protractor 14 to be used with either group of scales, in determining or establishing course.

Drift correction, magnetic variation and deviation can be made using the zero-center correction scales 31 and 32 on the straight edge member 12, in the manner generally well known in the art.

Accordingly, from the above description, it can be seen that an improved navigational plotter is provided which can be used in conjunction with both WAC and sectional charts, whether they be used for measuring distances in accordance with the U.S. system or the metric system. The navigational plotter also has clear, unobstructed course line windows between adjacent ones of the distance scales so that a course line can be clearly and easily observed, and is not obstructed by any of the distance scales on the plotter. Further still, the circular protractor rotatably secured to the plotter is proportioned such that it does not obscure any portion of any of the distance scales.

It will thus be seen that the objects set forth above, among those made apparent from the preceding description, are efficiently attained and certain changes may be made in the above article. Accordingly, it is intended that all matter contained in the above description or shown in the accompanying drawing shall be interpreted as illustrative and not in a limiting sense.

Now that the invention has been described, what is claimed as new and desired to be secured by Letters Patent is:

1. A navigational plotter comprising:
   an elongated straight edge member having two parallel straight edges opposite one another, and
   a circular protractor rotatably affixed thereto,
   a first plurality of distance scales disposed along and adjacent to one of said parallel straight edges,
   said first plurality of distance scales being calibrated in accordance with the scale of a first predetermined type of chart, said plurality of distance scales further being spaced apart so as to provide a clear, unobstructed course line window between adjacent ones of said plurality of distance scales, a second plurality of distance scales disposed along and adjacent to the other one of said parallel straight edges, said second plurality of distance scales along and adjacent said other one of said parallel edges being calibrated in accordance with the scale of a second predetermined type of chart and spaced apart so as to provide a clear, unobstructed course line window between adjacent ones of them,
   said first and second plurality of distance scales being printed on one side only of said straight edge member,
   said circular protractor having a compass rose thereon about its periphery and the diameter of said circular protractor being proportioned smaller than the distance between the most closely adjacent ones of said distance scales along and adjacent the opposite ones of said parallel straight edges, whereby none of the plurality of distance scales are obscured by the circular protractor, and a course line indicia on said straight edge member in operative relationship with said circular protractor, whereby said circular protractor can be used to determine a course direction when either one of the two straight edges and the associated plurality of distance scales are used.

2. The navigational plotter of claim 1, further comprising opaquing beneath the respective ones of said first and second plurality of distance scales, whereby said distance scales are highlighted.

3. The navigational plotter of claim 1, wherein the width of the course line windows is approximately ⅛ inch.

4. The navigational plotter of claim 1, further comprising an arcuate zero-center correction scale in cooperative relationship with said circular protractor, whereby said zero-center correction scale can be used to mechanically correct for the effect of wind drift, magnetic variation and magnetic deviation.

5. The navigational plotter of claim 4 wherein the plurality of distance scales in cooperative relationship can be used to interconvert statute, nautical and kilometer units of distances and speeds.

* * * * *